United States Patent
Sakamoto et al.

(10) Patent No.: US 11,373,619 B2
(45) Date of Patent: Jun. 28, 2022

(54) DISPLAY CONTROL APPARATUS, DISPLAY SYSTEM, AND NON-TRANSITORY COMPUTER READABLE MEDIUM

(71) Applicant: FUJIFILM Business Innovation Corp., Tokyo (JP)

(72) Inventors: Takashi Sakamoto, Kanagawa (JP); Fumiyoshi Kawase, Kanagawa (JP); Tsukasa Tsushima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 307 days.

(21) Appl. No.: 16/355,834

(22) Filed: Mar. 17, 2019

(65) Prior Publication Data
US 2019/0371265 A1 Dec. 5, 2019

(30) Foreign Application Priority Data

Jun. 4, 2018 (JP) .............................. JP2018-107059

(51) Int. Cl.
*G09G 5/00* (2006.01)
*G06T 7/60* (2017.01)
(Continued)

(52) U.S. Cl.
CPC ............... *G09G 5/006* (2013.01); *G06T 7/60* (2013.01); *G09G 5/34* (2013.01); *G09G 5/373* (2013.01);
(Continued)

(58) Field of Classification Search
CPC .......... G09G 5/006; G09G 5/34; G09G 5/373; G06T 7/60; H04N 1/00129
See application file for complete search history.

(56) References Cited

U.S. PATENT DOCUMENTS 5,825,942 A * 10/1998 Miyaza ................ H04N 1/3935
382/298
6,304,820 B1 * 10/2001 Goto ...................... G06F 3/0481
340/990

(Continued)

FOREIGN PATENT DOCUMENTS

| CN | 101753846 | 6/2010 |
| CN | 102035976 | 4/2011 |

(Continued)

OTHER PUBLICATIONS

"Office Action of China Counterpart Application" with English translation thereof, dated Dec. 3, 2021, p. 1-p. 26.

(Continued)

*Primary Examiner* — Todd Buttram
(74) *Attorney, Agent, or Firm* — JCIPRNET

(57) ABSTRACT

A display control apparatus includes an acquisition unit that acquires an image, a memory that stores multiple images acquired by the acquisition unit, a recognition unit that recognizes a size of a character included in an image to be displayed on a display from among the images stored on the memory, and a display controller that causes the display to display the images stored on the memory while switching from one image to another every set time period. The display controller determines a display setting of the image to be displayed on the display in response to the size of the character included in the image that the recognition unit has recognized and causes the display to display the image in the determined display setting.

8 Claims, 3 Drawing Sheets

(51) Int. Cl.
*G09G 5/373* (2006.01)
*G09G 5/34* (2006.01)
*H04N 1/00* (2006.01)
*G09F 9/35* (2006.01)

(52) U.S. Cl.
CPC .............. H04N 1/00129 (2013.01); *G06T 2207/30242* (2013.01); *G09F 9/35* (2013.01); *G09G 2310/08* (2013.01); *G09G 2320/08* (2013.01); *G09G 2320/10* (2013.01); *G09G 2380/06* (2013.01)

(56) References Cited

U.S. PATENT DOCUMENTS

| | | | |
|---|---|---|---|
| 7,336,378 B2 * | 2/2008 | Ichikawa | H04N 1/3875 358/1.11 |
| 8,472,090 B2 | 6/2013 | Itoh | |
| 8,553,083 B2 | 10/2013 | Kim et al. | |
| 9,317,764 B2 | 4/2016 | Baheti et al. | |
| 9,531,992 B2 | 12/2016 | Ishizaki | |
| 9,674,396 B1 * | 6/2017 | Pashintsev | H04N 1/19594 |
| 9,888,133 B2 | 2/2018 | Kida | |
| 10,079,978 B2 | 9/2018 | Kim et al. | |
| 10,263,701 B2 | 4/2019 | Aoyama et al. | |
| 10,699,485 B2 | 6/2020 | Zielkowski | |
| 10,951,309 B2 | 3/2021 | Aoyama et al. | |
| 2004/0036714 A1 * | 2/2004 | Blakely | G06F 3/0481 715/711 |
| 2009/0109247 A1 | 4/2009 | Kimura | |
| 2010/0141758 A1 * | 6/2010 | Kim | G06K 9/20 348/135 |
| 2011/0080623 A1 * | 4/2011 | Itoh | G06Q 30/02 358/474 |
| 2011/0286668 A1 * | 11/2011 | Konno | G06K 9/00463 382/182 |
| 2012/0154427 A1 | 6/2012 | Sugiyama | |
| 2015/0062164 A1 | 3/2015 | Kobayashi et al. | |
| 2015/0365625 A1 * | 12/2015 | Ishizaki | G06F 3/1423 348/581 |
| 2017/0178290 A1 | 6/2017 | Sugiura et al. | |
| 2017/0213377 A1 | 7/2017 | Torii et al. | |
| 2018/0367737 A1 | 12/2018 | Kim et al. | |
| 2019/0206132 A1 * | 7/2019 | Zielkowski | G06K 9/00671 |

FOREIGN PATENT DOCUMENTS

| | | |
|---|---|---|
| CN | 104423583 | 3/2015 |
| CN | 104871180 | 8/2015 |
| CN | 106405851 | 2/2017 |
| CN | 106716322 | 5/2017 |
| CN | 107076992 | 8/2017 |
| CN | 107466477 | 12/2017 |
| CN | 111526929 | 8/2020 |
| GB | 2314750 | 12/1998 |
| JP | 2009077282 | 4/2009 |
| JP | 2011043627 | 3/2011 |
| JP | 2016096510 | 5/2016 |
| JP | 2017084304 | 5/2017 |
| WO | 2014156896 | 10/2014 |

OTHER PUBLICATIONS

Office Action of Japan Counterpart Application, with English translation thereof, dated Apr. 12, 2022, pp. 1-6.

* cited by examiner

DISPLAY CONTROL APPARATUS, DISPLAY SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-107059 filed Jun. 4, 2018.

BACKGROUND

(i) Technical Field

The present disclosure relates to a display control apparatus, a display system, and a non-transitory computer readable medium.

(ii) Related Art

Japanese Unexamined Patent Application Publication No. 2016-96510 discloses a digital signage apparatus that displays a document read by an image forming apparatus. The image forming apparatus reads documents, generates, and stores multiple image data. In response to a user's operation, the image forming apparatus performs a display setting, such as a layout of how the multiple image data are displayed, a time period throughout which the image data is displayed, and the display order of the image data, and stores program information that indicates the display setting made. The image forming apparatus transmits the image data and program information to the digital signage apparatus, and the digital signage apparatus receives the image data and program information transmitted from the image forming apparatus. The digital signage apparatus displays an image, indicated by the received image data, in accordance with the program information.

SUMMARY

Aspects of non-limiting embodiments of the present disclosure relate to a digital signage apparatus that successively displays multiple images, each image for a set display time period. With the image displayed for the set display time period, the size of each character in the displayed image may be too small or the number of characters in the displayed image may be too large. It may be possibly difficult to complete reading the characters in the image within the display time period set by a user who views the displayed image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control apparatus. The display control apparatus includes an acquisition unit that acquires an image, a memory that stores multiple images acquired by the acquisition unit, a recognition unit that recognizes a size of a character included in an image to be displayed on a display from among the images stored on the memory, and a display controller that causes the display to display the images stored on the memory while switching from one image to another every set time period. The display controller determines a display setting of the image to be displayed on the display in response to the size of the character included in the image that the recognition unit has recognized and causes the display to display the image in the determined display setting.

BRIEF DESCRIPTION OF THE DRAWINGS

Exemplary embodiment of the present disclosure will be described in detail based on the following figures, wherein.

DETAILED DESCRIPTION

Figure 1:
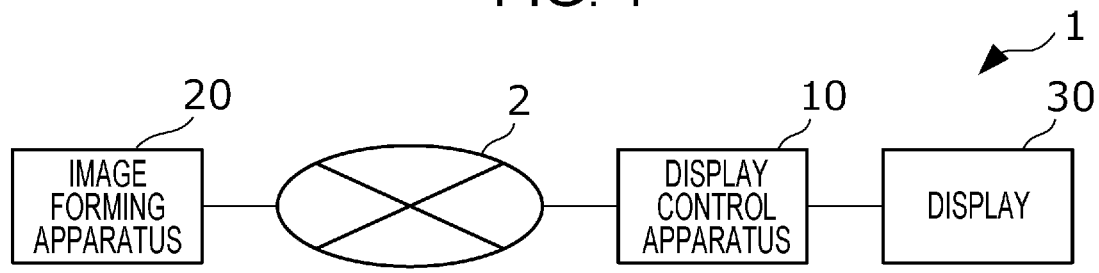
FIG. 1 illustrates apparatuses in a display system of an exemplary embodiment.

FIG. 1 illustrates apparatuses in a display system 1 of an exemplary embodiment. The display system 1 is also referred to as a digital signage system that displays a publicity or information by displaying a video or an image or characters. A communication network 2 is used for data communication, and connects to multiple computers. The communication network 2 includes a wired communication network and/or a wireless communication network.

An image forming apparatus 20 is a multi-function apparatus having an image forming functionality to form an image on a paper sheet, a scanning functionality to read a document, a copying functionality, and a facsimile functionality. The image forming apparatus 20 is an example of a reading device in the exemplary embodiment of the disclosure. The image forming apparatus 20 is connected to the communication network 2, and is thus connected to other computers via the communication network 2 for data communication. According to the exemplary embodiment, the image forming apparatus 20 has a functionality to transmit image data indicating an image read through the scanning functionality to another computer via the communication network 2. Multiple image forming apparatuses 20 may be connected to the communication network 2. Referring to FIG. 1, a single communication network 2 is illustrated for drawing simplicity.

The display 30 is a liquid-crystal display, for example, and is an example of a display in the exemplary embodiment of the disclosure. The display 30 is connected to the display control apparatus 10 and displays an image indicated by a video signal supplied from the display control apparatus 10. The display 30 is not limited to the liquid-crystal display, and may be a projector or an organic electroluminescent (EL) display. For simplicity of drawing, a single display 30 is illustrated in FIG. 1. Alternatively, multiple displays 30 may be connected to the display control apparatus 10.

The display control apparatus 10 is a computer that outputs the video signal indicating an image to be displayed on the display 30. The display control apparatus 10 is an example of a display control apparatus in the exemplary embodiment of the disclosure. The display control apparatus 10 is connected to the communication network 2, and acquires image data indicating the image to be displayed on the display 30 from another computer via the communication network 2. The display control apparatus 10 outputs to the display 30 the video signal responsive to the image indicated by the acquired image data, and causes the display 30 to display the image in a display setting appropriate for contents of the image. The display control apparatus 10 stores image data and causes the display 30 to display the images of the image data while switching from one image to another every predetermined time period.

The display system 1 may be typically installed in a store. The display 30 may be installed at the entrance of the store or within the store. The image forming apparatus 20 and the display control apparatus 10 may be installed in the office of the store. In the display system 1, the image forming apparatus 20 reads a document having a publicity or information to be displayed on the display 30, the display control apparatus 10 stores the image data indicating the read document, and the display 30 displays the image indicated by the stored image data. When the document of a publicity is read by the image forming apparatus 20, the read publicity is displayed at the entrance of the store or inside the store. If multiple image data are stored on the display control apparatus 10, the display control apparatus 10 may cause the multiple images to be displayed on the display 30 while switching from one image to another.

Figure 2:
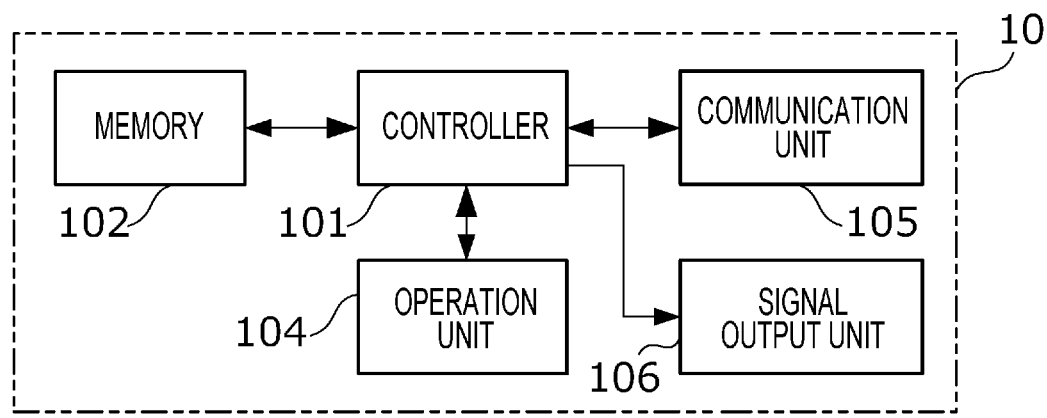
FIG. 2 illustrates a hardware configuration of a display control apparatus.

FIG. 2 illustrates the hardware configuration of the display control apparatus 10. A signal output unit 106 outputs a video signal indicating an image to be displayed on the display 30. A communication unit 105 functions as a communication interface that performs data communications via the communication network 2, and communicates with the image forming apparatus 20 via the communication network 2. A memory 102 may include a non-volatile memory, and stores the image data acquired from an external device.

An operation unit 104 includes multiple buttons to operate the display control apparatus 10. The operation unit 104 includes a touch panel that is a combination of a liquid-crystal display and a sensor that detects finger contact with a display screen of the liquid-crystal display. The touch panel displays a screen of graphic user interface (GUI) to operate the display control apparatus 10. According to the exemplary embodiment of the disclosure, the display control apparatus 10 includes the touch panel, and is operable with the touch panel and the buttons. Alternatively, the display control apparatus 10 may be without a touch panel, the liquid-crystal display thereof may display the screen of GUI, and the display control apparatus 10 may be operated using the buttons.

A controller 101 includes a central processing unit (CPU), a random-access memory (RAM), and a read-only memory (ROM). Functionalities of the display control apparatus 10 are implemented when a program (software) stored on the ROM is read onto hardware, such as the CPU and the RAM, and the CPU executes the program. The CPU thus performs control of the memory 102, control of the communication unit 105, control of the signal output unit 106, and control of data reading and/or data writing to the RAM and the memory 102. The program stored on the ROM and executed by the CPU is an example of a program related to the exemplary embodiment of the disclosure.

Figure 3:
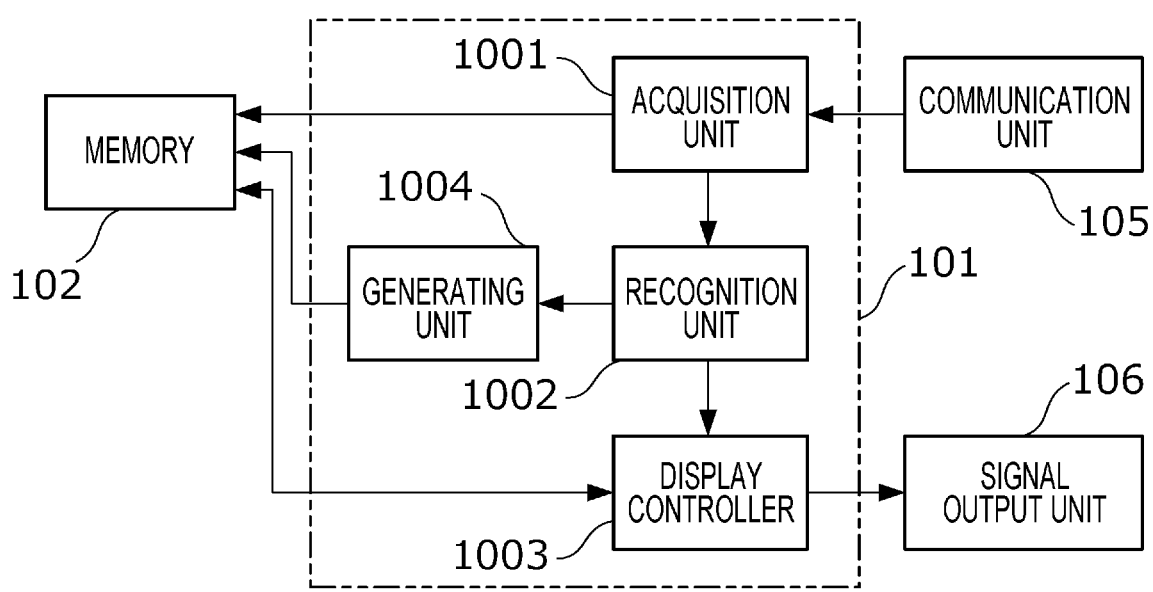
FIG. 3 is a functional block diagram illustrating the display control apparatus.

FIG. 3 is a functional block diagram illustrating functionalities characteristic of the exemplary embodiment of the disclosure from among the functionalities implemented by the display control apparatus 10. An acquisition unit 1001 controls the communication unit 105, thereby acquiring the image data from an external device. The acquisition unit 1001 is an example of an acquisition unit of the exemplary embodiment of the disclosure. The acquisition unit 1001 causes the memory 102 to store the acquired image data. A recognition unit 1002 performs a character recognition process on the image indicated by the image data acquired by the acquisition unit 1001. The recognition unit 1002 thus detects a text area where characters are present in the image, an area of the text area, and a size of the characters in the text area. The recognition unit 1002 is an example of a recognition unit of the exemplary embodiment of the disclosure. In accordance with recognition results of the recognition unit 1002, a display controller 1003 performs a display setting of the image indicated by the image data stored on the memory 102. The display controller 1003 outputs the video signal by controlling the signal output unit 106 such that the image is displayed on the display 30 in the display setting made. A generating unit 1004 generates the image of the text area recognized by the recognition unit 1002. The generating unit 1004 is an example of a generating unit of the exemplary embodiment of the disclosure.

A process of the exemplary embodiment is described below. The user of the display system 1 operates the image forming apparatus 20, thereby causing the image forming apparatus 20 via the scanning functionality to read the document of the publicity to be displayed on the display 30. The image forming apparatus 20 generates the image data indicating the read document. When the image forming apparatus 20 completes the reading of the document, the user performs an operation to transmit the generated image data to the display control apparatus 10. When the operation is performed, the image forming apparatus 20 transmits the generated image data to the display control apparatus 10. The display control apparatus 10 (the acquisition unit 1001) acquires the image data from the image forming apparatus 20.

Figure 4:
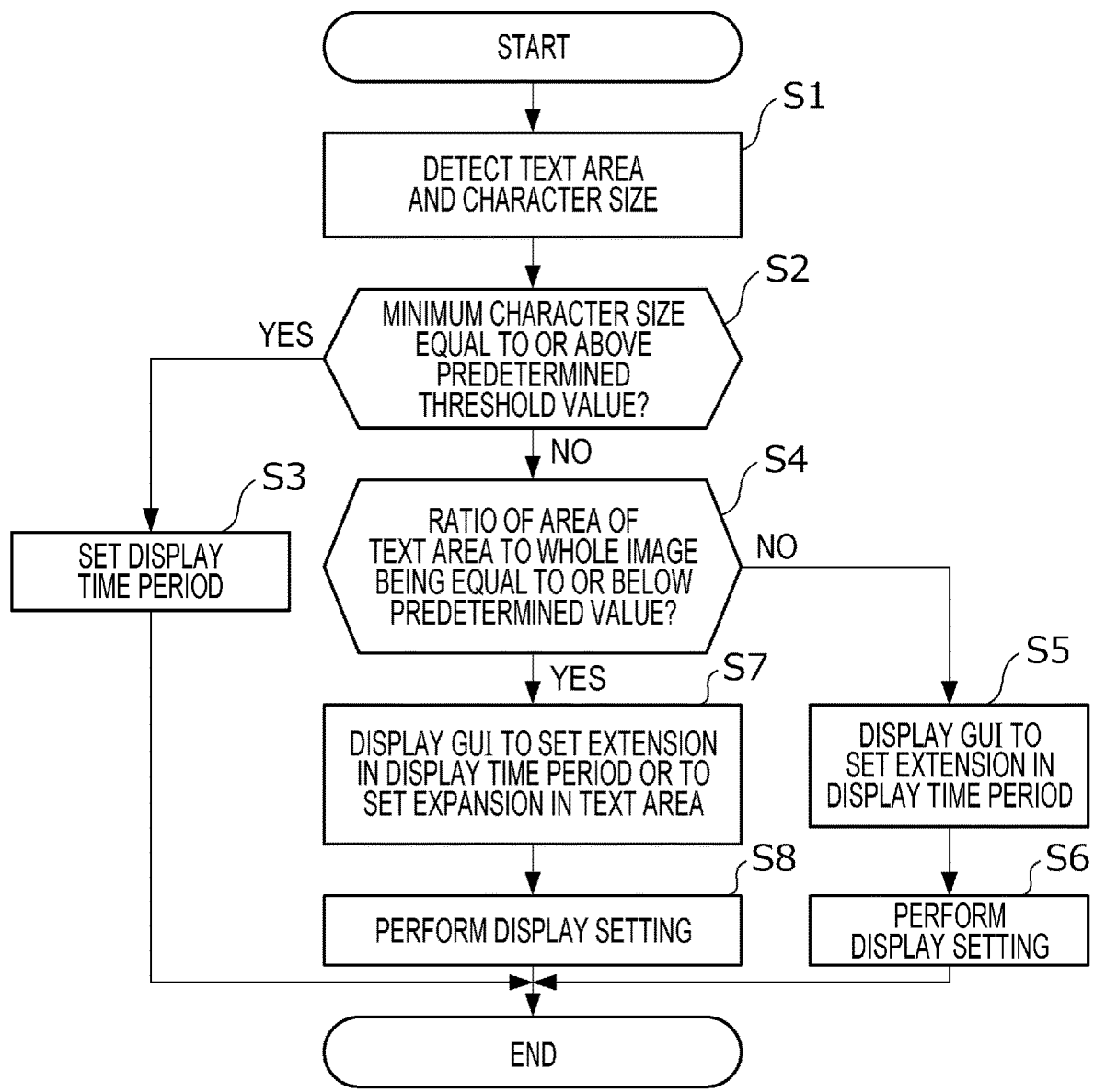
FIG. 4 is a flowchart illustrating a process of a controller.

FIG. 4 is a flowchart illustrating the process performed by the display control apparatus 10 that has acquired the image data. The controller 101 (the recognition unit 1002) acquires the image data, performs character recognition on the image indicated by the acquired image data, and thus detects the text area where the characters are present in the image, and the size of the characters within the text area (step S1). Upon completing the operation in step S1, the controller 101 determines whether a minimum character size from among the detected character sizes is equal to or above a predetermined threshold value (step S2).

If the minimum character size detected is equal to or above the predetermined threshold value (yes branch from step S2), the controller 101 (the display controller 1003) sets for the image indicated by the acquired image data a display time period throughout which the display 30 displays the image (step S3). The display time period set by the controller 101 is an example of a display setting of the image indicated by the image data. In step S3, the controller 101 sets the display time period to be a first time period.

If the minimum character size detected is below the predetermined threshold value (no branch from step S2), the controller 101 (the display controller 1003) determines whether a ratio of the area of the detected text area to the entire image is equal to or below a predetermined ratio (step S4). If the ratio of the area of the detected text area to the entire image is above a predetermined ratio (no branch from step S4), the controller 101 controls the touch panel of the operation unit 104 to display the GUI to extend the display time period (step S5).

Figure 5:
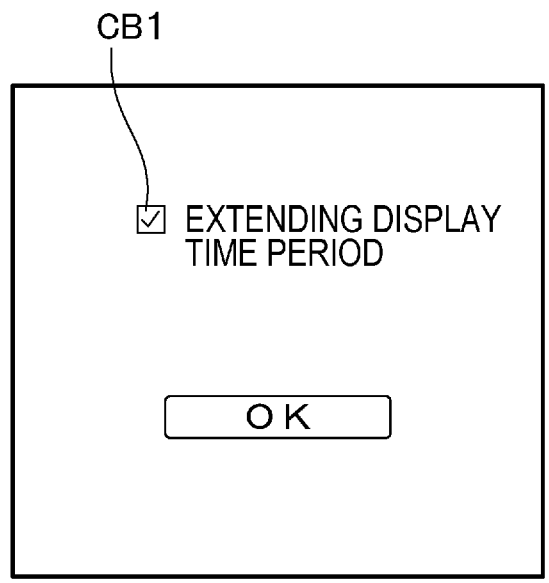
FIG. 5 illustrates an example of a screen displayed by the display control apparatus.

FIG. 5 illustrates an example of the GUI displayed in step S5. The controller 101 performs the display setting of the image, indicated by the acquired image data, in response to the operation that the user has performed on the touch panel on the screen of FIG. 5 (step S6). More specifically, when a check box CB1 for extending the display time period is checked and an operation to press an OK button is performed, the controller 101 performs the display setting such that the display time period of the image indicated by the acquired image data is set to be a second time period that is longer than the first time period. If the OK button is pressed with the check box CB1 for extending the display time period not checked, the controller 101 performs the display setting such that the display time period of the image indicated by the acquired image data reverts back to the first time period.

If the ratio of the detected text area to the entire image is equal to or below the predetermined ratio (yes branch from step S4), the controller 101 controls the touch panel of the operation unit 104 such that the GUI to set the extension in the display time period or the expansion of the text area is displayed (step S7).

Figure 6:
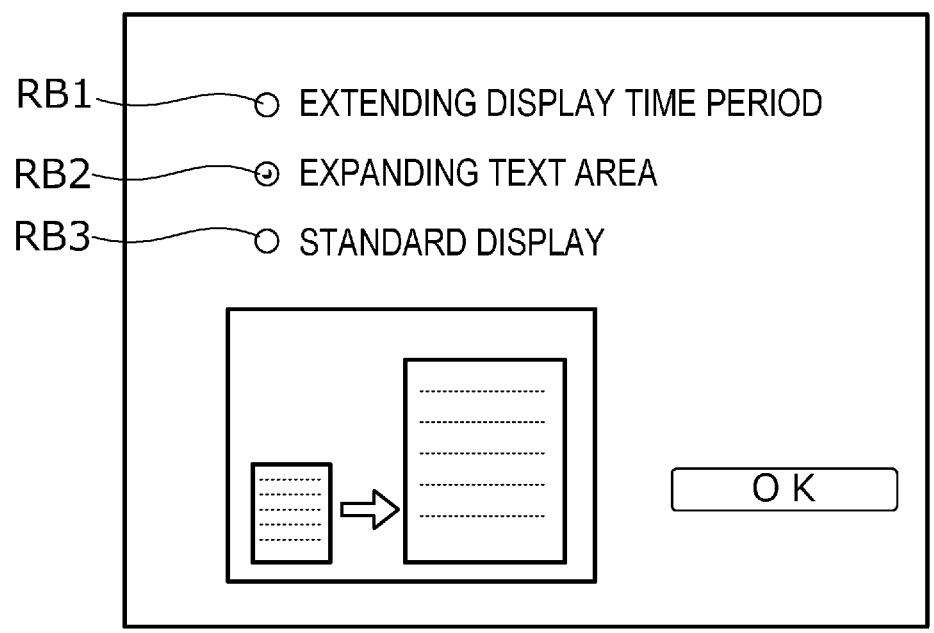
FIG. 6 illustrates an example of the screen displayed by the display control apparatus.

FIG. 6 illustrates an example of the GUI displayed in step S7. The controller 101 performs the display setting of the image indicated by the acquired image data in response to the operation the user has performed on the touch panel of the screen of FIG. 6 (step S8). More specifically, if the OK button is pressed with a radio button RB1 for the extension of the display time period checked, the controller 101 performs the display setting such that the display time period of the image indicated by the acquired image data is set to be the second time period.

When a radio button RB2 for the expansion of the text area is pressed, the controller 101 displays a preview having the expanded text area as illustrated in FIG. 6. When the OK button is pressed, the generating unit 1004 generates the image data with the detected text area expanded. The display controller 1003 performs the display setting to display the text area in an expanded form.

If the OK button is pressed with a radio button RB3 for a standard display checked, the controller 101 performs the display setting to set the display time period of the image indicated by the acquired image data to be the first display time period.

When the controller 101 (the display controller 1003) completes the display setting for the image indicated by the acquired image data, the controller 101 outputs the video data such that the image indicated by the acquired image data is displayed in the display setting made. If the display setting for the image indicated by the acquired image data is set to be the first time period in step S6, the controller 101 outputs the video signal of the image to the display 30. When the first time period has elapsed since the start of the outputting, the controller 101 starts outputting the video signal of an image to be displayed next to the display 30. If the display setting for the image indicated by the acquired image data is set to be the second time period in step S6, the controller 101 outputs the video signal of the image to the display 30. When the second time period has elapsed since the start of the outputting, the controller 101 starts outputting to the display 30 the video signal of an image to be displayed next.

If the display setting for the image indicated by the acquired image data is set to be the second time period in step S8, the controller 101 outputs the video signal of the image to the display 30. When the second time period has elapsed since the start of the outputting, the controller 101 starts outputting to the display 30 the video signal of an image to be displayed next. If the display setting for the image indicated by the acquired image data to expand the text area is set in step S8, the controller 101 outputs the video signal of the image to the display 30. When the first time period has elapsed since the start of the outputting, the controller 101 outputs the video signal of the image of the expanded text area. When a predetermined period of time has elapsed, the controller 101 starts outputting to the display 30 the video signal of the image to be displayed next. If the first time period is set for the display setting for the image indicated by the acquired image data in step S8, the controller 101 outputs the video signal of the image to the display 30. When the first time period has elapsed since the start of the outputting, the controller 101 starts outputting the video signal of the image to be displayed next.

The exemplary embodiment of the disclosure has been discussed. The disclosure is not limited to the exemplary embodiment described above. The disclosure may be embodied in a variety of exemplary embodiments. For example, the disclosure may be embodied by modifying the exemplary embodiment as described below. The exemplary embodiment and modifications described below may be combined.

In the exemplary embodiment, the display control apparatus 10 acquires the image data from the image forming apparatus 20. Alternatively, the display control apparatus 10 may acquire the image data from a scanning device that reads an image from a document, and generates image data from the read image. Alternatively, the display control apparatus 10 may acquire the image data, indicating the image to be displayed on the display 30, from a personal computer that is connected to the communication network 2.

In the exemplary embodiment, if the extension of the display time period is set on the screen of FIG. 5, the display time period of the image indicated by the image data is set to be the predetermined second time period. Alternatively, a GUI to set the display time period by seconds is displayed, and the user may set the length of the second display time period on the GUI.

In the exemplary embodiment, if the ratio of the area of the detected text area to the area of the entire image is equal to or below the predetermined ratio, the display setting is selected from one of the settings for extending the display time period on the screen, for expanding the text area, and for the standard display on the screen of FIG. 6. The disclosure is not limited to the exemplary embodiment. For example, the controller 101 controls the touch panel of the operation unit 104 to display the GUI having the check box for the extension of the display time period and the check box for the expansion of the text area.

If the OK box is pressed with the check box for the extension of the display time period checked, the controller 101 sets the display time period of the image indicated by the acquired image data to be the second time period in the display setting. If the OK box is pressed with the check box for the expansion of the text area checked, the controller 101 generates the image data with the detected text area expanded, and performs the display setting to expand the text area. If the OK button is pressed with the check box for the extension of the display time period checked and with the check box for the expansion of the text area checked, the controller 101 performs the display setting to set the display time period of the image indicated by the acquired image data to be the second time period and to set the text area to be displayed in an expanded form by generating the image data with the detected text area expanded. When the controller 101 performs these display settings, the controller 101 outputs to the display 30 the video signal of the image related to the displaying of the image indicated by the acquired image data. When the second time period has elapsed since the start of the outputting, the controller 101 starts outputting to the display 30 the video signal of the image of the expanded text area. When the predetermined time period has elapsed, the controller 101 outputs to the display 30 the video signal of the image to be displayed next. If the OK button is pressed with the check box for the extension of the display time period unchecked and with the check box for the expansion of the text area unchecked, the controller 101 performs the display setting to set the display time period of the image indicated by the acquired image data to be the first time period.

In the exemplary embodiment, the controller 101 detects the character size. Alternatively, the controller 101 may detect the number of characters rather than the character size. If the text area and the number of characters are detected in step S1, the controller 101 determines in step S2 whether the number of characters is below a predetermined threshold value. If the number of characters is below the predetermined threshold value, processing proceeds to step S3, and the controller 101 sets the display time period of the image indicated by the image data to be the first time period. If the number of characters is equal to or above the predetermined threshold value, the controller 101 proceeds to step S4.

When the text area is displayed in an expanded form in the exemplary embodiment of the disclosure, the image of the expanded text area may be overlaid on the image indicated by the image data. When the text area is displayed in an expanded form, the screen may be partitioned into two regions, the entire image indicated by the image data may be displayed in one region, and the image in the expanded text area may be displayed in the other region.

According to the exemplary embodiment of the disclosure, the text area is expanded when the radio button RB2 for the expansion of the text area is checked. The display form to expand the text area is not limited to the method of the exemplary embodiment. For example, when the radio button RB2 for the expansion of the text area is checked, the controller 101 performs the display setting to expand and scroll the text area. The controller 101 expands the image and then scrolls the expanded image of the image data in which the display setting is made for the expansion and scroll of the text area. In this case, as well, the text area is displayed in an expanded form.

When the displayed image is expanded and scrolled, the display 30 may be arranged in a portrait position and the image to be displayed may be of a landscape type. In such a case, the controller 101 may expand the image in the longitudinal direction of the display control apparatus 10 and may horizontally scroll the expanded image. When the displayed image is expanded and scrolled, the display 30 may be arranged in a landscape position and the image to be displayed may be of a portrait type. In such a case, the controller 101 may expand the image in the longitudinal direction of the display control apparatus 10 and may vertically scroll the expanded image. In this case, as well, the text area is displayed in an expanded form.

According to the exemplary embodiment of the disclosure, the display setting of the image is made by operating the operation unit 104. The method of making the display setting is not limited to the exemplary embodiment. The controller of the display control apparatus 10 may be a personal computer connected to the communication network 2 or a personal computer directly connected to the display control apparatus 10. In such a configuration, the display control apparatus 10 causes the personal computer to display the screen of FIG. 5 or FIG. 6, and performs the display setting of the image to be displayed on the display 30 in response to an operation performed on the screen displayed on the personal computer. According to the disclosure, the display control apparatus 10 and the display 30 may be integrated into a unitary body. If the display control apparatus 10 and the display 30 are integrated into a unitary body, and the display 30 has a touch panel, the screen of FIG. 6 or FIG. 7 may be displayed on the display 30 and the display control apparatus 10 may be operated using the touch panel. If the display control apparatus 10 and the display 30 are integrated into a unitary body, and the display 30 has no touch panel, the screen of FIG. 6 or FIG. 7 may be displayed on the display 30 and the display control apparatus 10 may be operated using a mouse and a keyboard. According to the disclosure, the screen of FIG. 6 or FIG. 7 may be displayed on whole or part of the screen of the display 30. According to the disclosure, the display control apparatus 10 may cause the image forming apparatus 20 having read the image to display the screen of FIG. 5 or FIG. 6, and may perform the display setting in response to an operation performed on the screen of FIG. 5 or FIG. 6 on the image forming apparatus 20.

According to the exemplary embodiment of the disclosure, if the OK button is pressed with the radio button RB1 for the extension of the display time period checked, the display time period is set to be the second time period. The GUI for the extension of the display time period is not limited to the exemplary embodiment. For example, a "YES" button and a "NO" button may be displayed, and if the YES button is operated, the display time period may be set to be the second time period.

The program related to the disclosure may be supplied in a recorded form on one of computer readable recording media including a magnetic recording medium (such as a magnetic tape, a hard disk drive (HDD), or a flexible disk (FD)), an optical recording medium (such as an optical disk), a magneto-optical recording medium, and a semiconductor memory, and is then installed onto a computer. Alternatively, the program may be downloaded onto the computer via the communication network 2 and then installed onto the computer.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display control apparatus comprising:
a processor, acquiring a plurality of images;
a memory that stores the plurality of images acquired by the processor,
wherein the processor is further configured to:
recognize a size of a character included in each of the plurality of images stored in the memory and to be displayed on a display;

determine a display setting of each of the plurality of images to be displayed on the display in response to the size of the character included in each of the plurality of images;

cause the display to display successively the plurality of images in the display setting, wherein the display setting includes a display time period of each of the plurality of images;

recognize a text area including the character in a first image;

determine if the size of the character in the text area of the first image is below a predetermined threshold value;

if the size of the character in the text area of the first image is below the predetermined threshold value, set the display time period of the first image to be longer when a ratio of the text area to the entire area of the first image is below a predetermined ratio than when the ratio of the text area to the entire area of the first image is equal to or above the predetermined ratio; and control the display to display the first image during the display time period of the first image, and control the display to switch from displaying the first image to display a second image when the display time period of the first image elapses, wherein the first image and the second image are among the plurality of images stored in the memory.

2. The display control apparatus according to claim 1, wherein the processor sets the display time period to be longer when the size recognized by the processor is below a predetermined threshold value than when the size is equal to or above the predetermined threshold value.

3. The display control apparatus according to claim 1, wherein the processor recognizes a number of characters included in the image displayed on the display, and wherein if the size recognized by the processor is below a predetermined threshold value, the processor sets the display time period to be longer when the number of characters recognized by the processor is equal to or above a predetermined threshold value than when the number of characters recognized by the processor is below the predetermined threshold value.

4. The display control apparatus according to claim 1, wherein the display setting is expanding the image displayed on the display.

5. The display control apparatus according to claim 4, wherein the processor recognizes a text area including a character included in the image displayed on the display, and generates an image in the text area, and wherein the processor causes the display to display the image in the text area in an expanded form.

6. The display control apparatus according to claim 4, wherein the display setting is expanding and scrolling the image displayed on the display.

7. A non-transitory computer readable medium storing a program causing a computer to execute a process for controlling displaying, the process comprising:

acquiring a plurality of images;

storing the plurality of images;

recognizing a size of a character included in each of the plurality of images stored in the memory and to be displayed on a display;

determining a display setting of each of the plurality of images to be displayed on the display in response to the size of the character included in each of the plurality of images;

causing the display to display successively the plurality of images in the display setting, wherein the display setting includes a display time period of each of the plurality of images;

recognizing a text area including the character in a first image;

determining if the size of the character in the text area of the first image is below a predetermined threshold value;

if the size of the character in the text area of the first image is below the predetermined threshold value, setting the display time period of the first image to be longer when a ratio of the text area to the entire area of the first image is below a predetermined ratio than when the ratio of the text area to the entire area of the first image is equal to or above the predetermined ratio; and controlling the display to display the first image during the display time period of the first image, and controlling the display to switch from displaying the first image to display a second image when the display time period of the first image elapses, wherein the first image and the second image are among the plurality of images stored in the memory.

8. A display system comprising a reading device including image forming apparatus that reads an image from a document, and an output circuit that outputs the image read by the image forming apparatus, and a display control apparatus, wherein the display control apparatus includes:

a processor, acquiring a plurality of images output by the output circuit;

a memory that stores the plurality of images acquired by the processor, wherein the processor is further configured to:

recognize a size of a character included in each of the plurality of images stored in the memory and to be displayed on a display;

determine a display setting of each of the plurality of images to be displayed on the display in response to the size of the character included in each of the plurality of images;

cause the display to display successively the plurality of images in the display setting, wherein the display setting includes a display time period of each of the plurality of images;

recognize a text area including the character in a first image;

determine if the size of the character in the text area of the first image is below a predetermined threshold value;

if the size of the character in the text area of the first image is below the predetermined threshold value, set the display time period of the first image to be longer when a ratio of the text area to the entire area of the first image is below a predetermined ratio than when the ratio of the text area to the entire area of the first image is equal to or above the predetermined ratio; and control the display to display the first image during the display time period of the first image, and control the display to switch from displaying the first image to display a second image when the display time period of the first image elapses, wherein the first image and the second image are among the plurality of images stored in the memory.

* * * * *